US 6,611,485 B2

(12) United States Patent
Kim et al.

(10) Patent No.: US 6,611,485 B2
(45) Date of Patent: Aug. 26, 2003

(54) APPARATUS AND METHOD FOR CORRECTING ASYMMETRY OF OPTICAL DISK REPRODUCING SYSTEM

(75) Inventors: Je-Kook Kim, Seoul (KR); Young-Wook Jang, Yongin (KR); Suk-Jung Lee, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 70 days.

(21) Appl. No.: 09/902,311

(22) Filed: Jul. 10, 2001

(65) Prior Publication Data

US 2002/0006097 A1 Jan. 17, 2002

Related U.S. Application Data

(62) Division of application No. 09/182,358, filed on Oct. 29, 1998, now Pat. No. 6,324,135.

(30) Foreign Application Priority Data

Nov. 10, 1997 (KR) .............................. 97 59072
May 7, 1998 (KR) .............................. 98 16296

(51) Int. Cl.[7] ................................. G11B 5/76
(52) U.S. Cl. .................................. 369/59.18; 369/53.31
(58) Field of Search ......................... 369/47.35, 47.15, 369/47.17, 47.25, 53.31, 59.21, 124.15, 59.18, 53.12, 53.34; 360/32

(56) References Cited

U.S. PATENT DOCUMENTS 5,831,951 A * 11/1998 Kamioka et al. ........ 369/47.26

* cited by examiner

Primary Examiner—Paul W. Huber
(74) Attorney, Agent, or Firm—Mills & Onello, LLP

(57) ABSTRACT

In an apparatus and a method for correcting asymmetry in an optical disk reproduction system, an analog RF signal is received from an optical diode and an asymmetry-corrected signal is output as a digital EFM signal. The apparatus includes envelope detectors for detecting upper and lower envelopes of the RF signal, a level controller for controlling the level of the sum of the upper envelope and the lower envelope and for outputting signal having the controlled level, and a comparator for comparing the level of the signal output from the level controller with the level of the RF signal and for outputting the comparison result as the digital EFM signal.

15 Claims, 9 Drawing Sheets

APPARATUS AND METHOD FOR CORRECTING ASYMMETRY OF OPTICAL DISK REPRODUCING SYSTEM

RELATED APPLICATIONS

This application is a divisional application of U.S. application Ser. No. 09/182,358, filed Oct. 29, 1998, now U.S. Pat. No. 6,324,135.

BACKGROUND OF THE INVENTION

In an optical disk reproduction system, a photodiode senses light transmitted to a disk by an optical pickup and converts the sensed, reflected optical signal into an analog RF signal. The analog RF signal output of the photodiode is provided to an asymmetry correcting apparatus, which corrects the asymmetry of the RF signal and converts the RF signal into a digital eight-to-fourteen modulation (EFM) signal. Namely, the asymmetry correcting apparatus slices the analog RF signal on the basis of an asymmetry-corrected slice reference level, and obtains the digital EFM signal. An example of such an asymmetry correcting apparatus is provided in 'EFM comparator (CXA12710)' (hereinafter, referred to as a conventional asymmetry correcting apparatus) described at page 89 of the "SONY SEMICONDUCTOR IC DATABOOK" published in 1990 by SONY®.

Hereinafter, the structure and operation of the conventional asymmetry correcting apparatus will be described with reference to the attached drawings.

FIG. 1 is a circuit diagram of a conventional asymmetry correcting apparatus. The apparatus includes capacitors C1, C2, and C3, a comparator 10, operational amplifiers 12 and 14, resistors R1, R2, R3, R4, R5, and R6, and inverters 11 and 12, with Vcc signifying a power supply.

The operational amplifier 14 shown in FIG. 1 operates as an automatic asymmetry buffer. Resistors R1, R2, R3, and R4 and the operational amplifier 12 operates as an automatic The operational amplifier 14 shown in FIG. 1 operates as an automatic asymmetry buffer. Resistors R1, R2, R3, and R4 and the operational amplifier 12 operates as an automatic asymmetry control amplifier. A low pass filter (LPF) 16, which can be connected externally, for detecting a direct current (DC) offset, is comprised of resistors R5 and R6 and capacitors C2 and C3. A CMOS buffer 18 is comprised of inverters 11 and 12.

Capacitor C1 shown in FIG. 1 eliminates the direct current component of the RF signal input via input terminal IN1, from an optical diode (not shown). The comparator 10 compares the alternating current (AC) component of the RF signal input at the positive input terminal thereof with a reference signal output from the operational amplifier 12, and outputs the comparison result through an output terminal OUT, as a digital EFM signal. The digital EFM signal is buffered by the CMOS buffer 18, and passes through the low pass filter 16, the asymmetry buffer 14, and the automatic asymmetry control amplifier 12, and is input to the negative input terminal of the comparator 10 as a reference signal.

A disk defect such as a scratch or hole is caused where the material of the disk is so poor, or the disk is so deeply gouged, that light passes through the disk without being reflected. Accordingly, the data is not detected. In the above-mentioned conventional asymmetry correcting apparatus, when the optical disk has such a defect, it can take considerable time, for example the time constant of the slice reference level, which is the level of the reference signal output from the operational amplifier 12, to determine the middle level of the RF signal. For example, since the time constant of the low pass filter 16, including resistors R5 and R6 and capacitors C2 and C3 is, for example, 5 ms, it is difficult for the slice reference level to track the middle level of the RF signal in the portion of the signal having a scratch or hole defect, which is much shorter than 5 ms in duration. Therefore, since the asymmetry of the RF signal is not properly corrected, systems which depend on an asymmetry-corrected signal, for example an error correction circuit are likely to malfunction.

SUMMARY OF THE INVENTION

The present invention relates to an optical disk reproduction system, and more particularly, to an apparatus and a method for correcting asymmetry in an RF signal output generated by an optical diode in the optical disk reproduction system, in a manner which overcomes the limitations of the prior art.

It is a first object of the present invention to provide an open-loop type apparatus for correcting asymmetry in an optical disk reproduction system, which can correct asymmetry using an envelope of an RF signal.

It is a second object of the present invention to provide a method for correcting asymmetry in an optical disk reproduction system using an envelope of an RF signal, in an open-loop system.

It is a third object of the present invention to provide an apparatus for correcting asymmetry in an optical disk reproduction system, which can correct asymmetry using a slice reference level obtained by subtracting the alternating current component of an RF signal from the RF signal.

It is a fourth object of the present invention to provide an asymmetry correcting method, in optical disk reproduction system using a slice reference level obtained by subtracting the alternating current component of an RF signal from the RF signal.

It is a fifth object of the present invention to provide a closed-loop type apparatus for correcting asymmetry in an optical disk reproduction system, which can correct asymmetry using an envelope of the RF signal.

It is a sixth object of the present invention to provide a method for correcting asymmetry, in optical disk reproduction system using an envelope of the RF signal, in a closed-loop system.

Accordingly, in a first embodiment, the present invention comprises an asymmetry correcting apparatus in an optical disk reproduction system, for correcting asymmetry in an RF signal received from an optical diode and for outputting the asymmetry-corrected signal as a digital EFM signal. The apparatus comprises a first envelope detector for detecting an upper envelope of the RF signal, a second envelope detector for detecting a lower envelope of the RF signal, a level controller for controlling the level of the sum of the upper envelope and the lower envelope and outputting a signal having the controlled level, and a comparator the controlled level with the level of the RF signal, and outputting the comparison result as the digital EFM signal.

To achieve the second object, a second embodiment of the present invention comprises an asymmetry correcting method in an optical disk reproduction system, for correcting asymmetry in an RF signal received from an optical diode and for obtaining a digital EFM signal. The method comprises the steps of detecting an upper envelope and a lower envelope of the RF signal, adding the upper envelope to the lower envelope, obtaining a slice reference level by controlling the level of the addition result, determining whether the slice reference level is less than the level of the RF signal, determining a first logic level to be the level of the digital EFM signal when the level of the RF signal is larger than the slice reference level, determining a second logic level supplementary to the first logic level to be the level of the digital EFM signal when the level of the RF signal is less than the slice reference level, and changing the level of the digital EFM signal when the slice reference level is the same as the level of the RF signal.

To achieve the third object, a third embodiment of the present invention comprises an asymmetry correcting apparatus in an optical disk reproduction system, for correcting asymmetry in an RF signal received from an optical diode and for outputting the asymmetry corrected signal as a digital EFM signal. The apparatus comprises a capacitor for removing the direct current component of the RF signal, a signal subtracter for subtracting the capacitor output from the RF signal and for outputting a signal having a level equal to the subtraction result, and a comparator for comparing the level of the signal output from the signal subtracter with the level of the RF signal, and outputting the comparison result as the digital EFM signal.

To achieve the fourth object, a fourth embodiment of the present invention comprises an asymmetry correcting method in an optical disk reproduction system, for correcting asymmetry in an RF signal received from an optical diode and for obtaining a digital EFM signal. The method comprises the steps of obtaining an alternating current component of the RF signal by removing a direct current component of the RF signal, obtaining a slice reference level of the RF signal by subtracting the alternating current component from the RF signal, determining whether the slice reference level is larger than the level of the RF signal, determining a first logic level to be the level of the digital EFM signal when the slice reference level is larger than the level of the RF signal, determining a second logic level supplementary to the first logic level to be the level of the digital EFM signal when the slice reference level is less than the level of the RF signal, and changing the level of the digital EFM signal when the slice reference level is the same as the level of the RF signal.

To achieve the fifth object, a fifth embodiment of the present invention comprises an asymmetry correcting apparatus in an optical disk reproduction system, for correcting asymmetry in an RF signal output from an optical diode and outputting the asymmetry corrected signal as a digital EFM signal. The apparatus comprises a first envelope detector for detecting an upper envelope of the RF signal, a second envelope detector for detecting a lower envelope of the RF signal, a level controller for controlling the level of the sum of the upper envelope and the lower envelope and outputting a first reference signal having a level equal to the level-controlled sum, a first low pass filter for filtering out a high frequency component of the first reference signal and outputting the filtered result, a second low pass filter for filtering out a high frequency component of the digital EFM signal and outputting the filtered result, an amplifier for amplifying a signal output from the second low pass filter by a predetermined amount and outputting the amplification result, a subtracter for subtracting the output of the first low pass filter from the amplifier and outputting the subtraction result, an adder for adding the output of the subtracter to the first reference signal and outputting the addition result, and a comparator for comparing the output of the adder received as a second reference signal with the RF signal, and outputting the comparison result as the digital EFM signal.

To achieve the sixth object, a sixth embodiment of the present invention comprises an asymmetry correcting method in an optical disk reproduction system, for obtaining a digital EFM signal by correcting the asymmetry of an RF signal output from an optical diode. The method comprises the steps of detecting an upper envelope and a lower envelope of the RF signal, adding the upper envelope to the lower envelope, obtaining a reference signal by controlling the level of the addition result, extracting a direct current component of the reference signal, subtracting the direct current component of the reference signal from a direct current component of the previously asymmetry-corrected digital EFM signal, obtaining a slice reference level by adding the subtraction result to the reference signal, determining whether the level of the RF signal is larger than the slice reference level, determining a first logic level to be the level of the currently asymmetry-corrected digital EFM signal when the level of the RF signal is larger than the slice reference level, determining a second logic level supplementary to the first logic level to be the currently asymmetry-corrected level of the digital EFM signal when the level of the RF signal is less than the slice reference level, and changing the level of the digital EFM signal when the slice reference level is the same as the level of the RF signal.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 2:
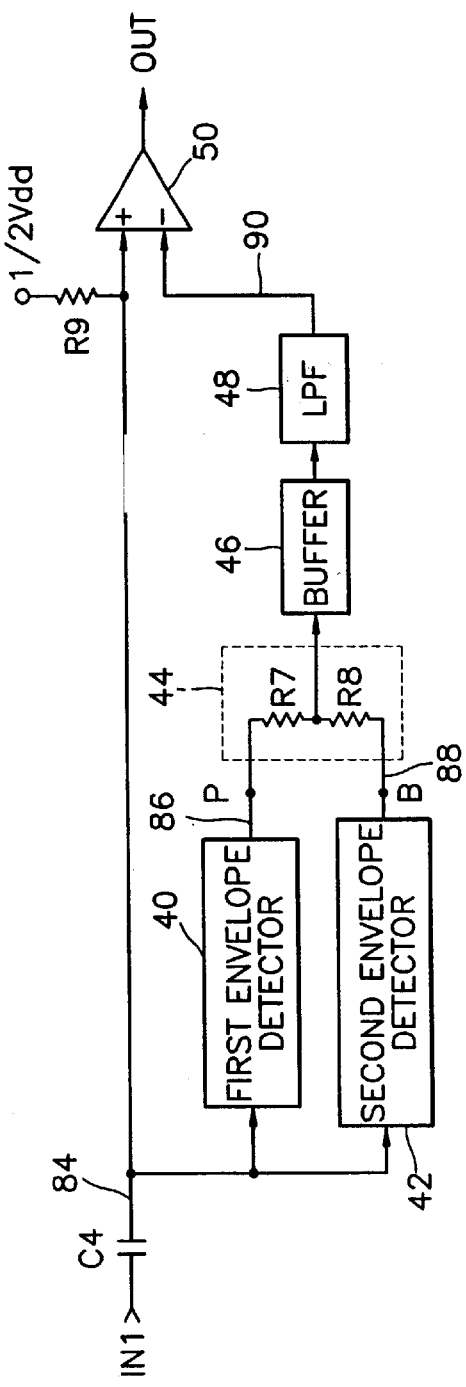
FIG. 2 is a block diagram of an asymmetry correcting apparatus in an optical disk reproduction system according to an embodiment of the present invention.

FIG. 2 is a block diagram of an asymmetry correcting apparatus in an optical disk reproduction system according to an embodiment of the present invention. The apparatus includes a capacitor C4, first and second envelope detectors 40 and 42, a level controller 44 comprised of resistors R7 and R8, a buffer 46, a low pass filter (LPF) 48, a resistor R9, and a comparator 50.

Figure 3:
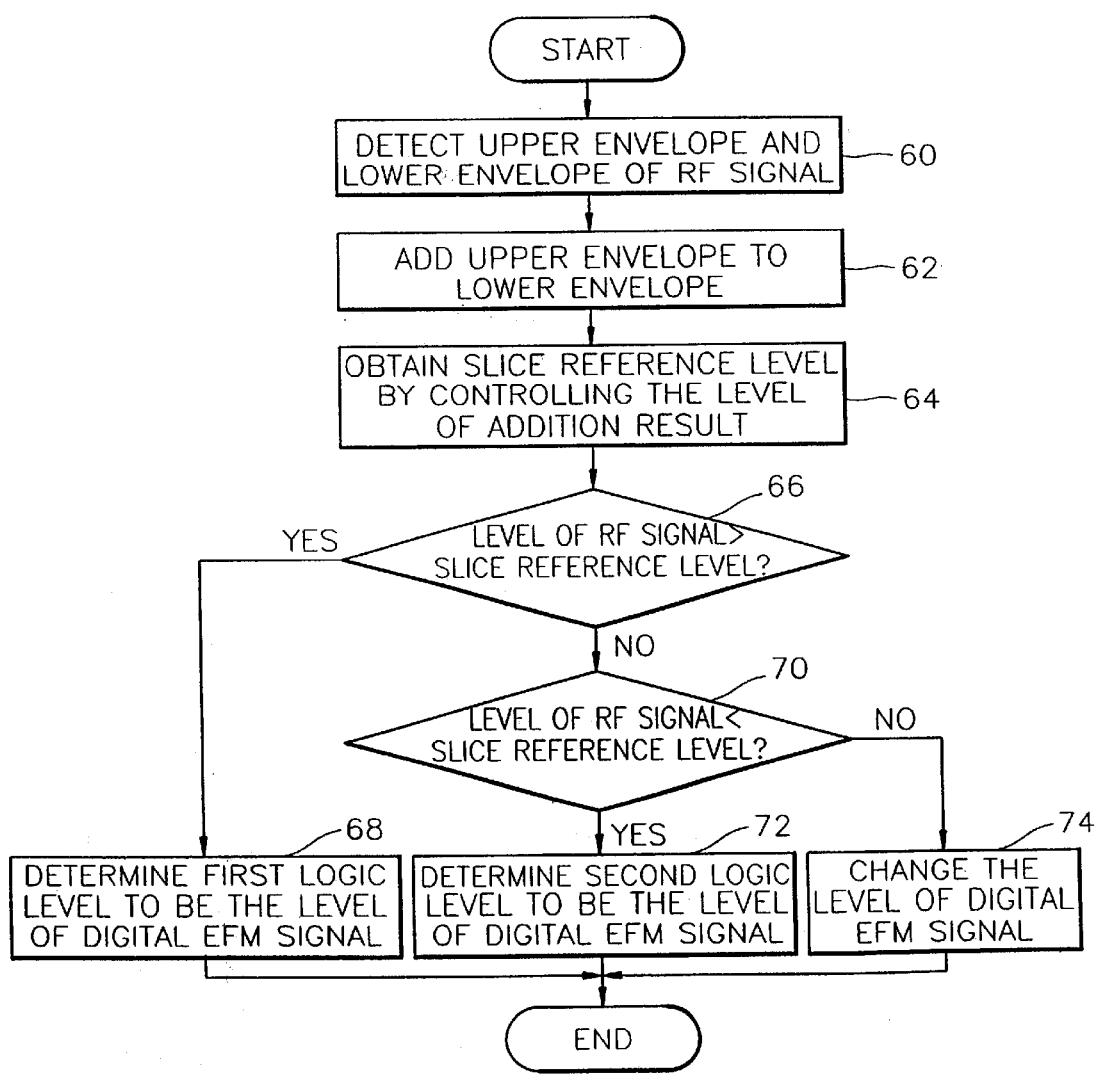
FIG. 3 is a flow diagram of an asymmetry correcting method according to the present invention, as performed in the apparatus shown in FIG. 2.

FIG. 3 is a flow diagram describing the steps of an asymmetry correcting method according to the present invention, for example, performed in the apparatus shown in FIG. 2. The method includes the steps of obtaining a slice reference level using envelopes detected from the RF signal (steps 60 through 64) and determining the level of a digital EFM signal according to the slice reference level (steps 66 through 74).

Figure 4A:
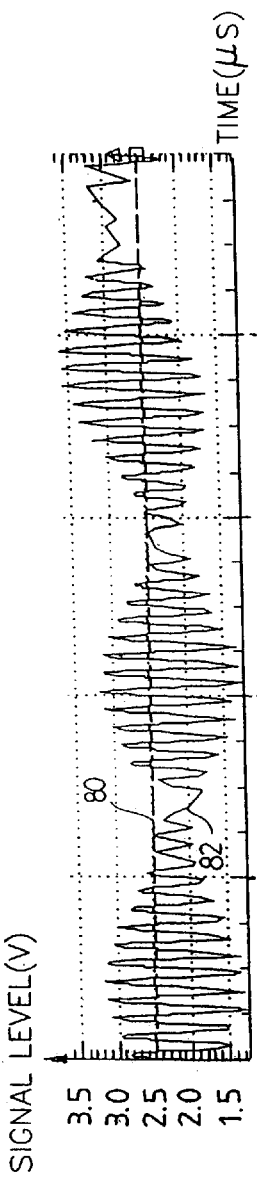
FIGS. 4A through 4D are timing diagrams of internal signals of a conventional asymmetry correcting apparatus and the asymmetry correcting apparatus according to the present invention.
Figure 4B:
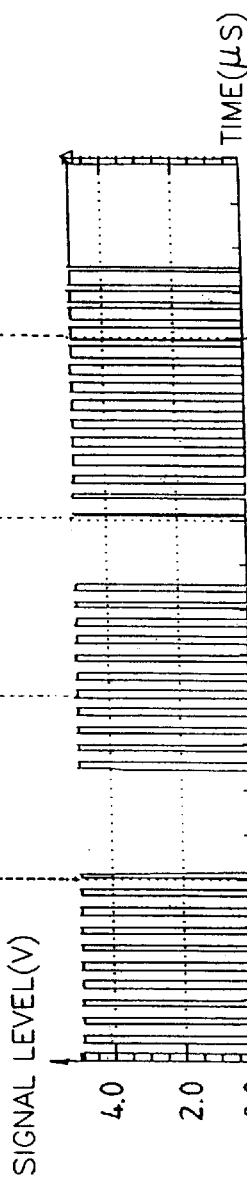

FIGS. 4A through 4D are timing diagrams for comparing of internal signals of the conventional asymmetry correcting apparatus with those of the asymmetry correcting apparatus according to the present invention, when a single power supply is used instead of a dual power supply. FIG. 4A shows a reference signal 80 output from the operational amplifier 12 of the apparatus shown in FIG. 1, and an RF signal 82 output from the capacitor C1. FIG. 4B shows the digital EFM signal output OUT from the comparator 10 shown in FIG. 1.

Figure 4C:
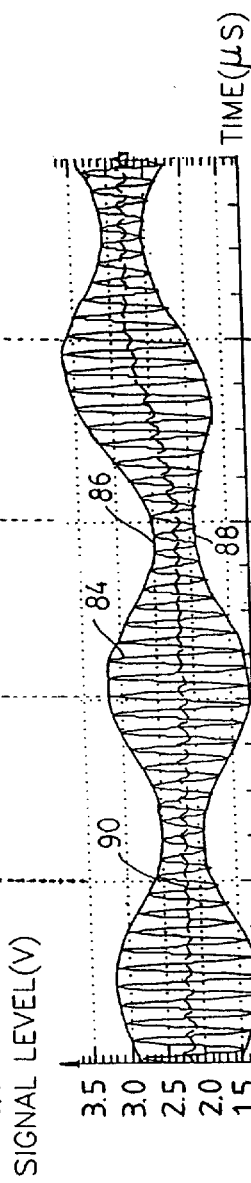
Figure 4D:
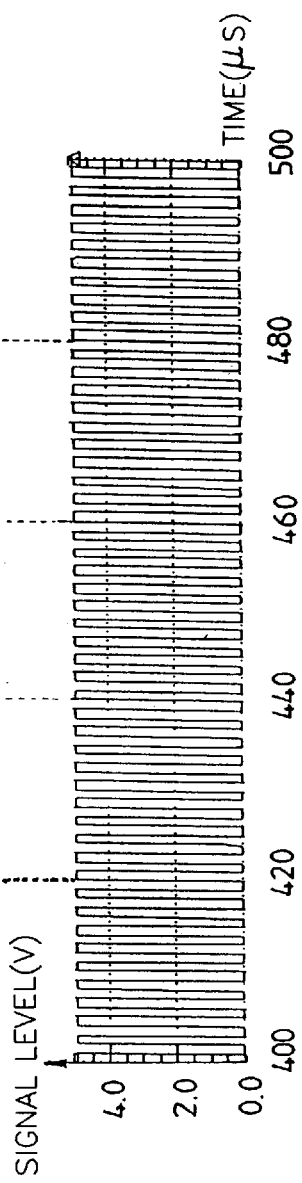

FIG. 4C shows an RF signal 84 removed of the direct current component, output from the capacitor C4 of the inventive embodiment of FIG. 2, signals 86 and 88 output from the first and second envelope detectors 40 and 42 respectively, and a reference signal 90 input to the negative input terminal of comparator 50. FIG. 4D shows the digital EFM signal output from the comparator 50.

The capacitor C4 shown in FIG. 2 removes the direct current component of the RF signal, received from an optical diode (not shown) through an input terminal IN1, and outputs the RF signal 84 removed of the direct current component, to the positive input terminal of the comparator 50 and to the first and second envelope detectors 40 and 42. The first and second envelope detectors 40 and 42 respectively detect the upper envelope 86 and the lower envelope 88 of the RF signal 84 removed of the direct current component, and output the upper envelope 86 and the lower envelope 88 shown in FIG. 4C to the level controller 44 (step 60 of FIG. 3).

Following this, the level controller 44 adds the upper envelope signal 86 detected by the first envelope detector 40 to the lower envelope signal 88 detected by the second envelope detector 42 (step 62 of FIG. 3). The level controller 44 reduces the level of the addition result by ½ and outputs the reference signal 90 shown in FIG. 4C, having the controlled level as the slice reference level, to the buffer 46 (step 64 of FIG. 3). When the values of the resistors R7 and R8 in the level controller 44 are the same, the level of the addition result can be reduced by ½. In this manner, the first and second envelope detectors 40 and 42, and the level controller 44, operate to extract a central value between the upper envelope 86 and the lower envelope 88 of the RF signal 84, as the slice reference level.

Following step 64 (see FIG. 3), the comparator 50 determines whether the level of the RF signal 84 output from the capacitor C4 is greater than the slice reference level, which is the level of the reference signal 90 (step 66 of FIG. 3). When the level of the RF signal 84 is larger than the slice reference level, a digital EFM signal of a first logic level, for example, a "high" logic level, is generated at an output terminal OUT (step 68 of FIG. 3). When the level of the RF signal 84 is not greater than the slice reference level, it is determined whether the level of the RF signal 84 is less than the slice reference level (step 70 of FIG. 3). When the level of the RF signal 84 is less than the slice reference level, the digital EFM signal of a second logic level which is complementary to the first logic level, for example, a "low" logic level, is output at the output terminal OUT (step 72 of FIG. 3). However, when the level of the RF signal 84 is the same as the slice reference level, the level of the digital EFM signal is toggled from the "high" logic level to the "low" logic level or, alternatively, from the "low" logic level to the "high" logic level, and output through the output terminal OUT (step 74 of FIG. 3). The comparator 50 outputs the digital EFM signal shown in FIG. 4D, having a level determined by the above operation, through the output terminal OUT. A resistor R9 connected between the RF signal 84 removed of the direct current level and a reference power supply (½ Vdd) supplies a bias voltage to the comparator 50.

An optional buffer 46 for buffering the reference signal output from the level controller 44 can be provided in order to reduce the influence of impedance. In order to reduce the noise component, the low frequency component of the signal output from the buffer 46 can be filtered by an optional low pass filter (LPF) 48, and the filtered signal is input to the negative input terminal of the comparator 50.

The asymmetry correcting apparatus according to the present invention is operable without capacitor C4 and resistor R9, unlike the conventional apparatus shown in FIG. 2. In this embodiment, the comparator 50 receives an RF signal including a direct current component and an alternating current component thereof through the positive input terminal, and receives the reference signal detected from the envelopes of the RF signal including the direct current component and the alternating current component, through the negative input terminal. The level of the input RF signal is compared to that of the reference signal, and a digital EFM signal is output having a level which is determined according to the comparison result as described above.

Figure 5:
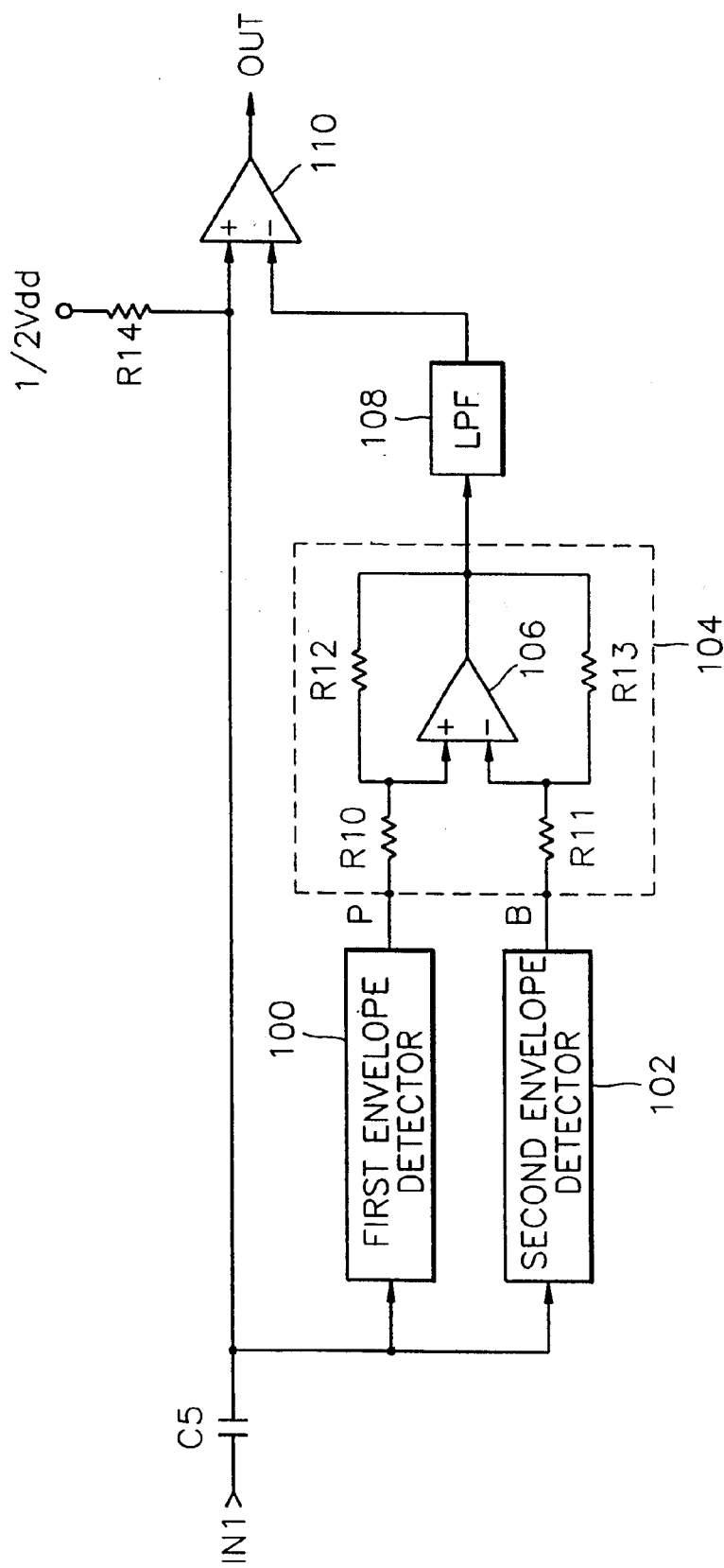
FIG. 5 is a block diagram of an asymmetry correcting apparatus of an optical disk reproduction system according to an alternative embodiment of the present invention.

FIG. 5 is a block diagram of the asymmetry correcting apparatus of the optical disk reproduction system according to an alternative embodiment of the present invention. The apparatus includes a capacitor C5, first and second envelope detectors 100 and 102, a level controller 104, a low pass filter (LPF) 108, a resistor R14, and a comparator 110.

The capacitor C5, the first and second envelope detectors 100 and 102, the LPF 108, and the comparator 110, shown in FIG. 5, respectively perform the same functions as the capacitor C4, the first and second envelope detectors 40 and 42, the LPF 48, and the comparator 50, shown in FIG. 2. However, the level controller 104 shown in FIG. 5 performs the functions of the level controller 44 and the buffer 46 which are shown in FIG. 2, and includes an operational amplifier 106, a resistor R10 connected between the upper envelope output P from the first envelope detector 100 and the positive input terminal of the operational amplifier 106, a resistor R11 connected between the lower envelope output B from the second envelope detector 102 and the negative input terminal of the operational amplifier 106, a resistor R12 connected between the positive input terminal of the operational amplifier 106 and the output terminal of the operational amplifier 106 from which the reference signal is output, and a resistor R13 connected between the negative input terminal and the output terminal of the operational amplifier 106. When the values of resistors R10, R11, R12, and R13 are substantially the same, the level controller 104 outputs reference signal 90, at a level which is the center between the upper envelope 86 and the lower envelope 88 as the slice reference level, to the LPF 108, as shown in FIG. 4C.

As mentioned above, the apparatus shown in FIG. 5 is operable without capacitor C5 and resistor R14. The asymmetry correcting apparatus according to the present invention shown in FIG. 5, is also suitable for performing the asymmetry correcting method described above with reference to FIG. 3.

Figure 6:
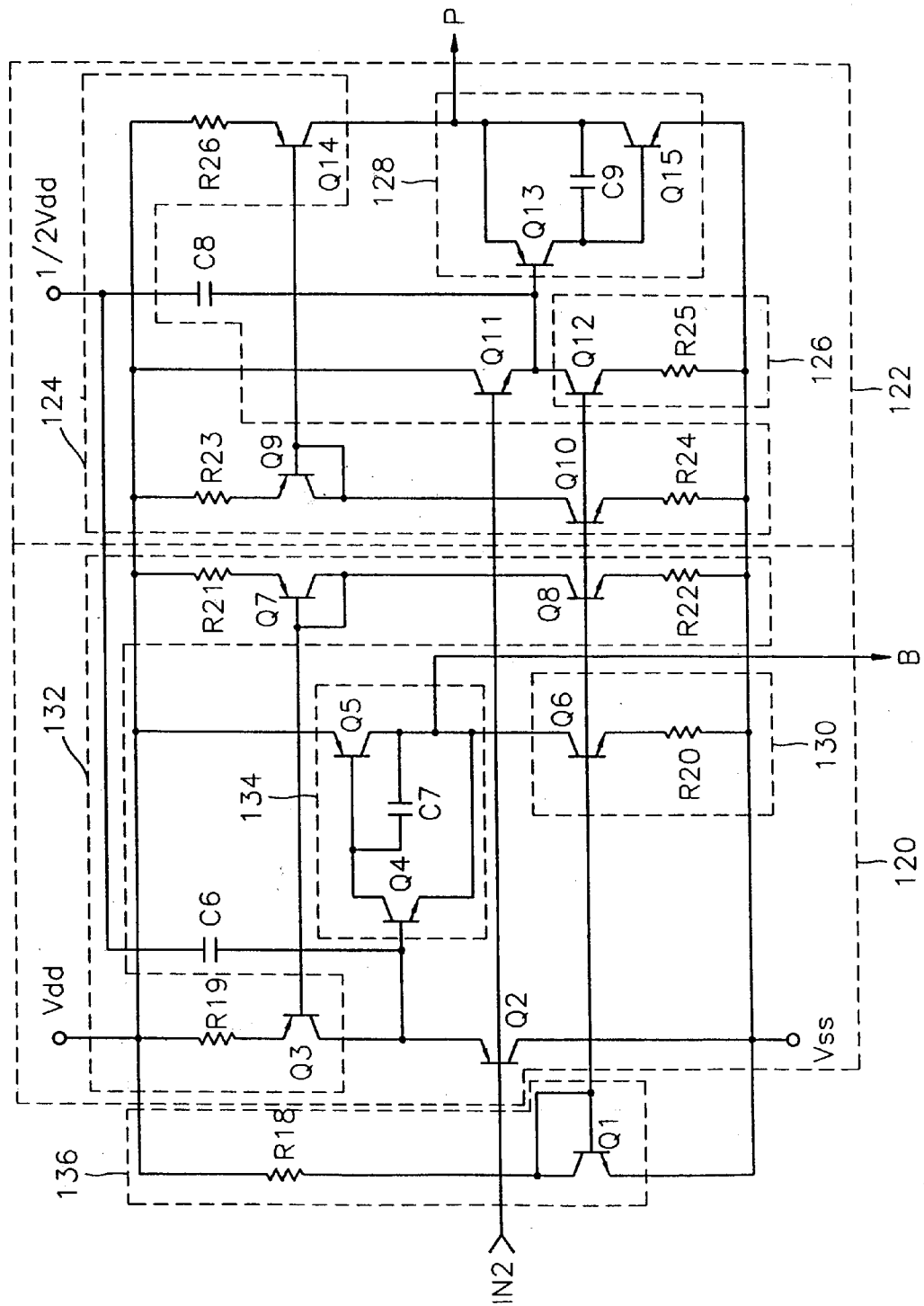
FIG. 6 is a circuit diagram of first and second envelope detectors, according to an embodiment of the present invention.

FIG. 6 is a circuit diagram of the first and second envelope detectors, for example detectors 40, 42, 100, 102 of FIGS. 2 and 5, according to an embodiment of the present invention. The first envelope detector 122 is comprised of a first biasing portion 124, a transistor Q11, a capacitor C8, a first current restricting portion 126, and a first output buffer 128. The second envelope detector 120 is comprised of a second biasing portion 130, a transistor Q2, a capacitor C6, a second current restricting portion 132 and a second output buffer 134. A reference current source 136 is commonly used by both the first and second envelope detectors 122 and 120.

The structure and function of the circuit shown in FIG. 6 is now described as follows. The first biasing portion 124 is comprised of resistors R23, R24, and R26 and transistors Q9, Q10, and Q14, and supplies a first bias current to the first output buffer 128. The second biasing portion 130 comprised of a transistor Q6 and a resistor R20, and supplies a second bias current to the second output buffer 134.

The transistor Q11 is turned on or off in response to the RF signal input through the input terminal IN2, and charges or discharges capacitor C8. Likewise, transistor Q2 is turned on or off in response to the RF signal input through the input terminal IN2, and discharges or charges capacitor C6. Namely, when the transistor Q11 is turned on in response to the RF signal, capacitor C8 is charged. When transistor Q11 is turned off, capacitor C8 is discharged. Also, when transistor Q2 is turned on in response to the RF signal, capacitor C6 is discharged. When transistor Q2 is turned off, capacitor C6 is charged. Bipolar transistors Q3, Q7, Q9, and Q14 can be replaced with MOS transistors.

The first current restricting portion 126 is comprised of a transistor Q12 and a resistor R25, and restricts the quantity of charge discharged from capacitor C8 when transistor Q14 is turned off. The second current restricting portion 132 is comprised of transistors Q3, Q7, and Q8 and resistors R19, R21, and R22, and restricts the quantity of charge applied to capacitor C6 when transistor Q2 is turned off.

The first output buffer 128, comprised of transistors Q13 and Q15 and capacitor C9, is biased in response to the first bias current supplied through transistor Q14, and buffers the voltage according to the quantity of charge charged in capacitor C8 to output the buffered voltage as an upper envelope (P). Also, the second output buffer 134, comprised of transistors Q4 and Q5 and a capacitor C7, is biased in response to the second bias current, and buffers the voltage according to the quantity of charge discharged from the capacitor C6 to output the buffered voltage as a lower envelope (B). The first output buffer 128 has a Darlington structure in order to improve the charge performance of the capacitor C8 by minimizing the base current of the transistor Q13. The second output buffer 134, also has a Darlington structure, in order to improve the discharge performance of the capacitor C6 by minimizing the base current of the transistor Q4.

The first or second output buffers 128, 134 may comprise configurations other than the Darlington structure. In this case, since the transistor Q5 and the capacitor C7 of the second output buffer 134 are not necessary, the collector of the transistor Q4 is connected directly to a supply voltage (Vdd) and the emitter of the transistor Q4 is connected to the collector of the transistor Q6. In the same manner, since the transistor Q15 and the capacitor C9 of the first output buffer 128 are not necessary, the emitter of the transistor Q13 is connected to the collector of the transistor Q14 and the collector of the transistor Q13 is connected directly to reference potential Vss. The reference potential Vss becomes, for example, 2.5 volts when the power supply Vdd is single, and becomes, for example, 0 volts when the power supply Vdd is dual.

The reference current source 136 is comprised of a resistor R18 and a transistor Q1, and forms a current mirror with the first and second biasing portions 124 and 130 and the first and second current restricting portions 126 and 132 and operates as a source for the respective portions. In the optical disk reproduction system, the level of the envelope to be detected can vary according to the speed of the optical disk. Therefore, the resistor R18 of the reference current source 136 may comprise a variable resistor, in order to accommodate the change of level.

The first envelope detector 122 having the above structure and function tracks the upper envelope 86 as the capacitor C8 is charged when the transistor Q11 is activated by the RF signal 84 shown in FIG. 4C. However, the first envelope detector 122 cannot follow the lower envelope 88, since the quantity of charge charged in the capacitor C8 when the transistor Q1 is turned off by the RF signal 84 is affected by the current restricted by transistor Q12. The upper envelope 86 (P) is output to the level controller, passing through the transistor Q13 which serves as a buffer. The frequency of the upper envelope 86 can be determined by the current restricted by the transistor Q12 and the value of the capacitor C8.

The second envelope detector 120 tracks the lower envelope 88 as the capacitor C6 is discharged when the transistor Q2 is activated by the RF signal 84. However, the second envelope detector 120 cannot follow the upper envelope 86, since the quantity of charge charged in the capacitor C6 when the transistor Q2 is turned off by the RF signal 84 is affected by the current restricted by the transistor Q3. The lower envelope 88 (B) is output to the level controller, passing through the transistor Q4 which operates as a buffer. The frequency of the lower envelope 88 can be determined by the current restricted by the transistor Q3 and the value of the capacitor C6.

Figure 7:
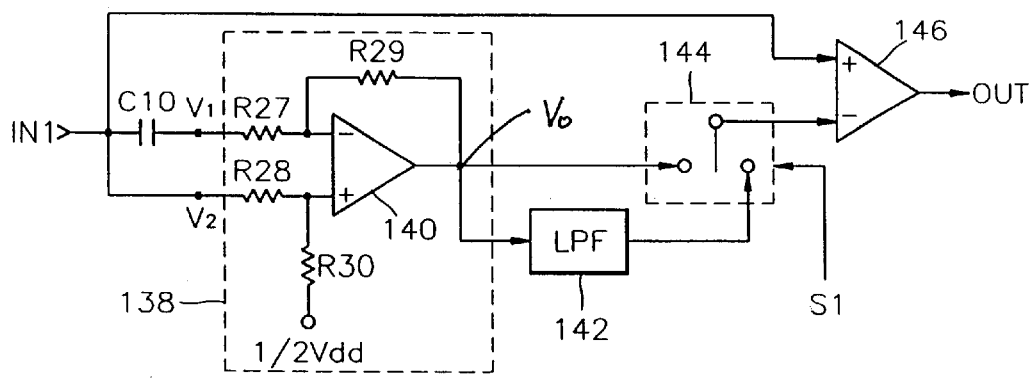
FIG. 7 is a circuit diagram of an asymmetry correcting apparatus for an optical disk reproduction system according to an alternative embodiment of the present invention.

FIG. 7 is a circuit diagram of an asymmetry correcting apparatus for an optical disk reproduction system according to an alternative embodiment of the present invention. The apparatus includes a capacitor C10, a signal subtracter 138 comprised of resistors R27, R28, R29, and R30, and an operational amplifier 140, a low pass filter (LPF) 142, a switch 144, and a comparator 146.

Figure 8:
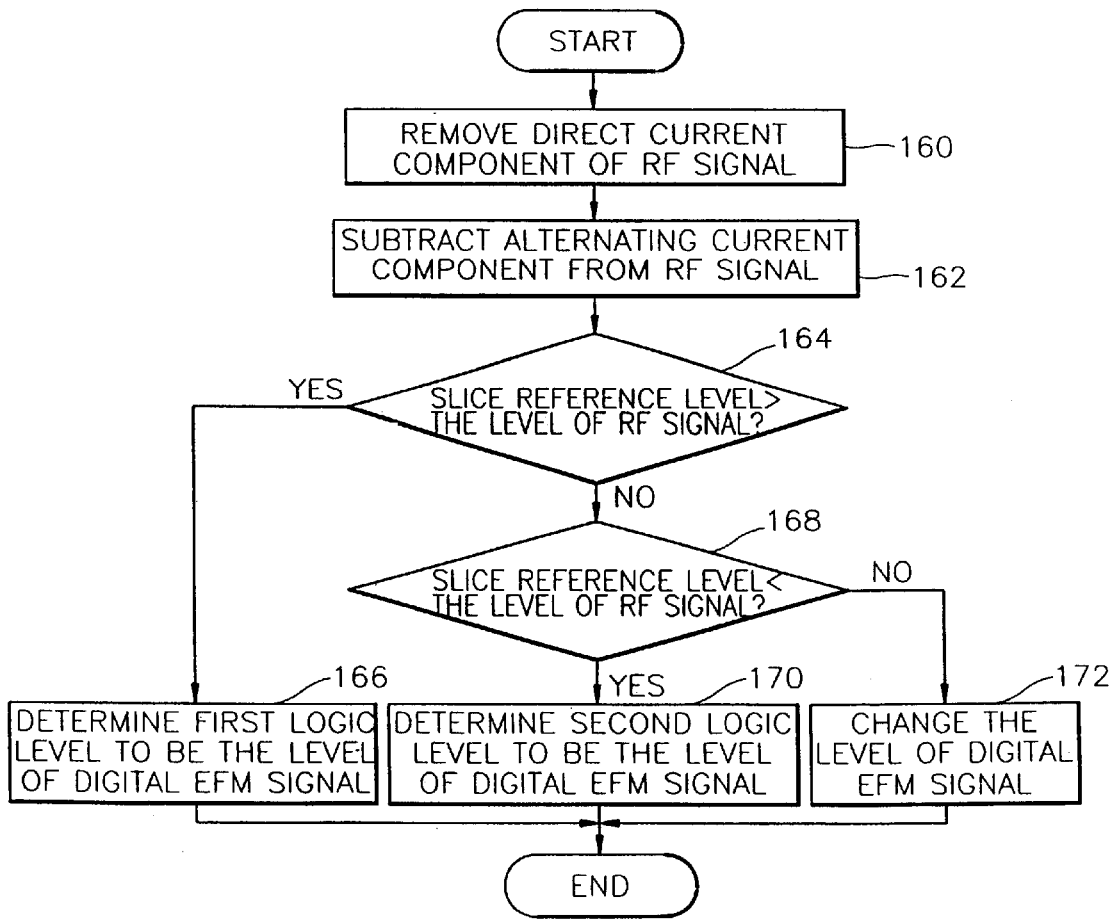
FIG. 8 is a flow diagram of an asymmetry correcting method according to the present invention, as performed in the apparatus shown in FIG. 7.

FIG. 8 is a flowchart describing an asymmetry correcting method according to the present invention, for example as performed by the apparatus shown in FIG. 7. The method includes the steps of obtaining a slice reference level which is the level of the reference signal (steps 160 and 162) and determining the level of the digital EFM signal by comparing the slice reference level with the level of the RF signal (steps 164 through 172).

Capacitor C10 shown in FIG. 7 removes the direct current component of the RF signal input through the input terminal IN1 (step 160 FIG. 8). The signal subtracter 138 receives the RF signal removed of the direct current component $V_1$, and the RF signal including the direct current component and the alternating current component $V_2$, subtracts the alternating component of the RF signal from the RF signal including the direct current component and the alternating current component $V_2$, and outputs the subtraction result, i.e., the direct current component of the RF signal, as the reference signal $V_O$ (step 162 of FIG. 8). Namely, the reference signal Vo obtained by the following equation 1 is output from the signal subtracter 138 to the LPF 142 and the switch 144 according to the relationship:

$$V_o = \frac{(R_{27}+R_{29})\left(R_{30}V_2+R_{28}\frac{V_{dd}}{2}\right)}{R_{27}(R_{28}+R_{30})} - \frac{R_{29}}{R_{27}}V_1 \quad (1)$$

where $V_2$ represents the RF signal input through the input terminal IN1, and $V_1$ represents the RF signal removed of the direct current component and output by the capacitor C10, and Vdd represents the supply voltage. When $R_{27}=R_{28}=R_{29}=R_{30}$, Equation 1 simplifies to the following:

$$V_0 = V_2 - V_1 + \frac{V_{dd}}{2} \quad (2)$$

The reference signal $V_O$ output from the signal subtracter 138 is input to the negative input terminal of the comparator 146 after the low frequency component is filtered by the low pass filter 142. Alternatively, the reference signal can be directly input to the negative input terminal of the comparator 146 without being filtered by the low pass filter 142. For this, the switch 144, switched in response to a select signal S1 output from a controller (not shown), selectively outputs either the reference signal output from the signal subtracter 138 or the reference signal output from the low pass filter 142, to the negative input terminal of the comparator 146.

The low pass filter 142 filters out the high frequency component of the reference signal output from the signal subtracter 138, above a cutoff frequency of not more than, for example, 200 KHz, in order to remove ripple from the reference signal.

After step 162 of FIG. 8, the comparator 146 determines whether the slice reference level, which is the level of the reference signal, is larger than the level of the RF signal input through the input terminal IN1 (step 164). When the slice reference level is larger than the level of the RF signal, the first logic level is determined to be the level of the digital EFM signal (step 166). However, when the slice reference level is not more than the level of the RF signal, it is determined whether the slice reference level is less than the level of the RF signal (step 168). When the slice reference level is less than the level of the RF signal, the second logic level supplementary to the first logic level is determined to be the level of the digital EFM signal (step 170). However, when the slice reference level is the same as the level of the RF signal, the level of the digital EFM signal is changed from the "low" logic level to the "high" logic level or from the "high" logic level to the "low" logic level (step 172). The comparator 146 outputs the digital EFM signal having the level determined by the above operation to the output terminal OUT.

Figure 1:
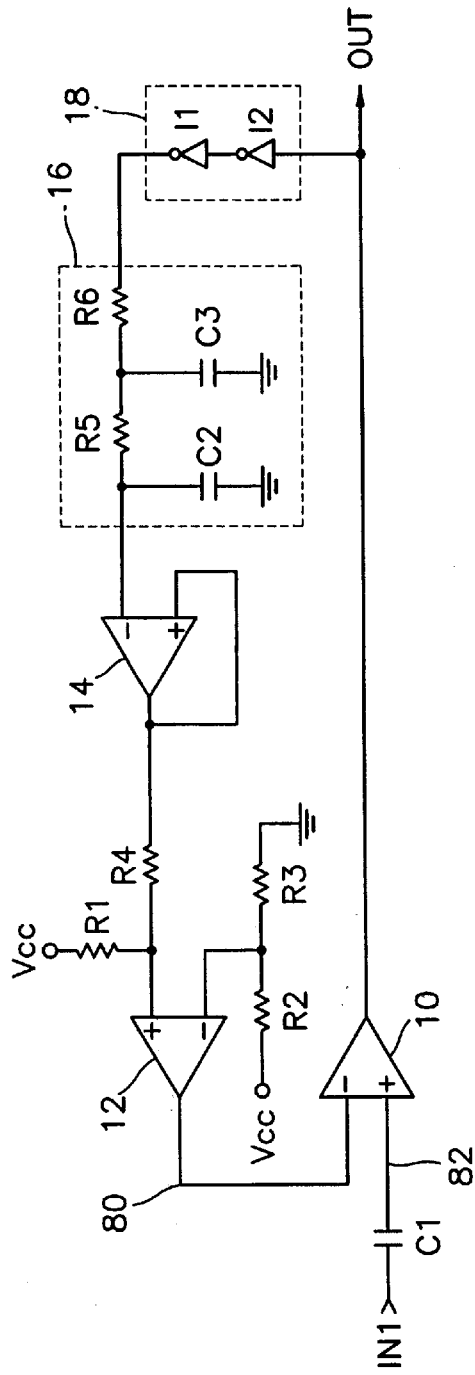
FIG. 1 is a circuit diagram of a conventional apparatus for correcting asymmetry.

As a result, in the asymmetry correcting apparatus shown in FIG. 7, it is possible to correct asymmetry more quickly since there is no delay and no large time constant because capacitors such as C2 and C3 of the conventional apparatus shown in FIG. 1 are not necessary.

Since the apparatus shown in FIGS. 2 and 5 is an open-loop configuration, the apparatus cannot automatically correct the asymmetry which is not exactly correct in the open-loop apparatus. Accordingly, in order to automatically recorrect the asymmetry which is still not corrected, the structure and operation of a closed-loop asymmetry correcting apparatus of an optical disk reproduction system according to the present invention, and a corresponding correcting method, will be described as follows with reference to the attached drawings including FIGS. 4C and 4D.

Figure 9:
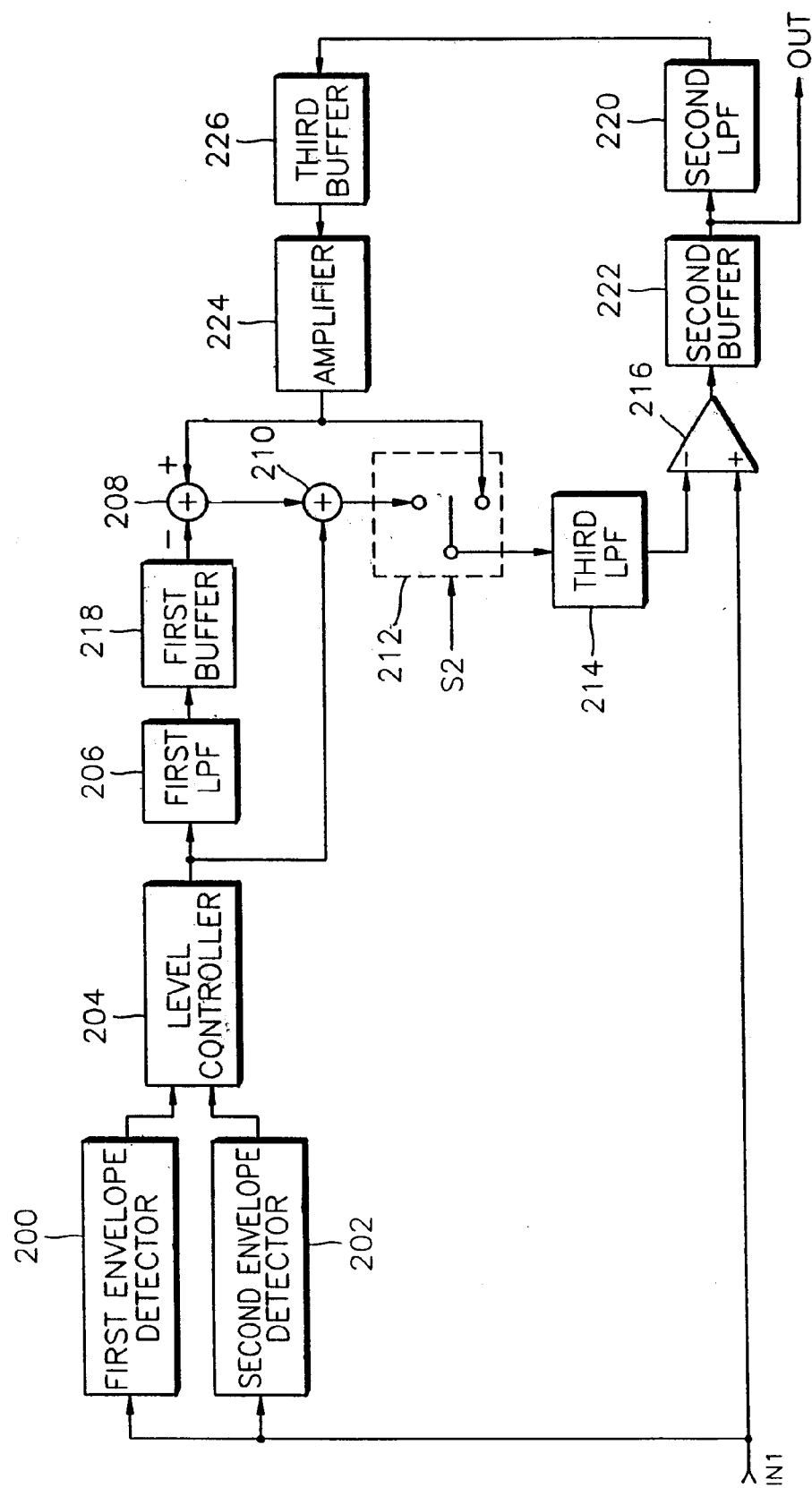
FIG. 9 is a block diagram of an asymmetry correcting apparatus according to an alternative embodiment of the present invention.

FIG. 9 is a block diagram of a closed-loop asymmetry correcting apparatus according to an alternative embodiment of the present invention. The apparatus includes first and second envelope detectors 200 and 202, a level controller 204, first, second and third low pass filters (LPF) 206, 220 and 214, first, second and third buffers 218, 222 and 226, a subtracter 208, an adder 210, a signal selector 212, a comparator 216, and an amplifier 224.

Figure 10:
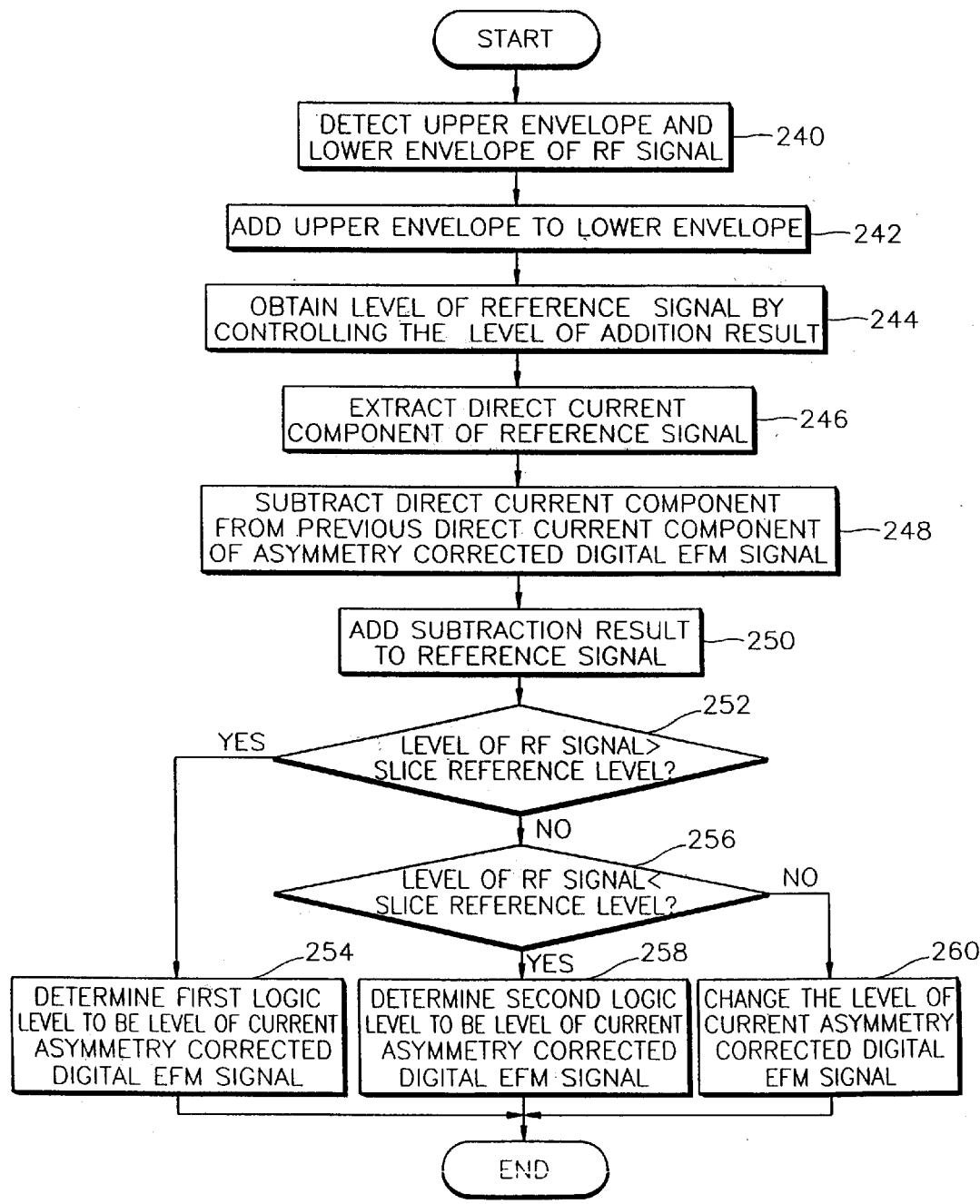
FIG. 10 is a flow diagram describing an asymmetry correcting method according to the present invention, as performed in the apparatus shown in FIG. 9.

FIG. 10 is a flow diagram for describing the asymmetry correcting method according to the present invention, for example, as performed in the apparatus shown in FIG. 9. The method includes the steps of obtaining the level of the reference signal using the envelopes detected from the RF signal (steps 240 through 244), determining the slice reference level (steps 246 through 250), and determining the level of the digital EFM signal according to the slice reference level (steps 252 through 260). It should be noted that the level of the reference signal referred to in the following description is different from the slice reference level.

Although the signal 84 shown in FIG. 4C is the RF signal which passed through the capacitor C4 or C5 as shown in FIG. 2 or 5, the RF signal directly input through the input terminal IN1 without passing through a capacitor, as shown in FIG. 9, also has approximately the same waveform as the signal 84 of FIG. 4C. Therefore, the apparatus shown in FIG. 9 and the method shown in FIG. 10 will be described as follows with reference to FIGS. 4C and 4D.

The first and second envelope detectors 200 and 202 shown in FIG. 9 respectively detect the upper envelope 86 and the lower envelope 88 shown in FIG. 4C of the RF signal input from the optical diode (not shown) through the input terminal IN1, and output the detected upper envelope 86 and lower envelope 88 to the level controller 204 (step 240 of FIG. 10).

The first and second envelope detectors 200 and 202 perform the same functions as the first and second envelope detectors shown in FIGS. 2 and 5. Therefore, the first and second envelope detectors 200 and 202 can be configured according to the circuit shown in FIG. 6.

After step 240, the level controller 204 adds the upper envelope 86 detected by the first envelope detector 200 to the lower envelope 88 detected by the second envelope detector 202 (step 242). The level controller 204 next reduces the level of the addition result by ½ and outputs the reference signal having the controlled level to the first low pass filter 206 and the adder 210 (step 244).

The level controller 204 may comprise a pair of resistors, as in the controller 44 of FIG. 2, or four resistors and one operational amplifier, as in the level controller 104 of FIG. 5. In the resistor-pair configuration, a buffer (not shown) can be provided between the level controller 204 and the first low pass filter 206. The provided buffer (not shown) can have a Darlington configuration having a large input impedance as mentioned above, in order to isolate the first low pass filter 206 from the level controller 204. Namely, the reference signal output from the level controller 204 can be buffered by the buffer (not shown) in order to reduce the influence of the impedance of the resistors constituting the level controller 204 on the first low pass filter 206.

As a result, the level controller 204 extracts the reference signal (RS) represented by the following equation 3, having, as its level, a center value between the upper envelope 86 and the lower envelope 88 of the RF signal.

$$RS = RS(AC) + RS(DC) \tag{3}$$

wherein RS(AC) represents the alternating current component of the reference signal, and RS(DC) represents the direct current component of the reference signal.

Following step 244, the first low pass filter 206 outputs to the first buffer 218 the direct current component RS(DC) of the reference signal (RS) extracted by low pass filtering the reference signal (RS) (step 246). The first buffer 218 shown in FIG. 9, which generally tracks the low pass filter, buffers the direct current component RS(DC) of the filtered reference signal and outputs the buffered direct current component RS(DC) to the subtracter 208.

The subtracter 208 subtracts, from an initial value, the direct current component RS(DC) of the reference signal which is the output of the first buffer 218, when the apparatus shown in FIG. 9 is in an initial state, and subtracts the direct current component RS(DC) of the reference signal from the direct current component AS(DC) of the digital EFM signal in which the asymmetry is previously corrected, when the apparatus in not in an initial state (step 248). Here, the initial value is Vdd/2. The second low pass filter 220 shown in FIG. 9 extracts the direct current component of the digital EFM signal output from the comparator 216 and outputs the extracted direct current component to the amplifier 224 through the third buffer 226. The amplifier 224 amplifies the direct current component output through the third buffer 226 by a predetermined amount and outputs the amplified signal to the signal selector 212 and the subtracter 208 as the direct current component AS(DC) of the previously asymmetry-corrected digital EFM signal. In order to reduce time spent when the level of the digital EFM signal rises or falls, i.e., the time spent when the level of the digital EFM signal transfers, a second buffer 222 can optionally be inserted between the comparator 216 and the second low pass filter 220.

Following step 248, the adder 210 adds the subtraction result output from the subtracter 208 to the reference signal output from the level controller 204 and outputs the addition result (SRL) shown in the equation 4 to the negative input terminal of the comparator 216 as the slice reference level (step 250) according to the following relationship:

$$SRL = [AS(AC) - RS(DC)] + [RS(DC) + RS(AC)] \tag{4}$$

$$= AS(DC) + RS(AC)$$

The signal selector 212 and/or the third low pass filter 214 can optionally be inserted between the adder 210 and the negative input terminal of the comparator 216. Here, the signal selector 212 selectively outputs either the output of the adder 210 or the direct current component AS(DC) in response to the select signal S2 input from the outside. Namely, the select signal S2 is externally input according to whether the RF signal is asymmetry corrected using the comparator 216, the second buffer 222, the second low pass filter 220, the third buffer 226, and the amplifier 224, or in addition using the first and second envelope detectors 200 and 202, the level controller 204, the first low pass filter 206, the first buffer 218, the subtracter 208, and the adder 210. The third low pass filter 214 removes noise from the signal input to the negative input terminal of the comparator 216. Namely, the third low pass filter 214 filters out the high frequency component of the signal output from the signal selector 212 or the adder 210, and outputs the filtered signal to the negative input terminal of the comparator 216 as signal having the slice reference level 90.

Following step 250, the comparator 216 determines whether the level 84 of the RF signal input through the input terminal IN1 is greater than the slice reference level 90 (step 252 of FIG. 10). When the level 84 of the RF signal is larger than the slice reference level 90, the digital EFM signal having the first logic level, for example, the "high" logic level, is output through the second buffer 222 and the output terminal OUT (step 254). However, when the level 84 of the RF signal is not more than the slice reference level 90, it is determined whether the level 84 of the RF signal is less than the slice reference level 90 (step 256). When the level 84 of the RF signal is less than the slice reference level 90, the digital EFM signal of the second logic level supplementary to the first logic level, for example, the "low" logic level, is output through the second buffer 222 and the output terminal OUT (step 258). However, when the level 84 of the RF signal is the same as the slice reference level 90, the level of the digital EFM signal is changed from the "high" logic level to the "low" logic level or from the "low" logic level to the "high" logic level and output through the second buffer 222 and the output terminal OUT (step 260). A comparator 216 outputs the digital EFM signal shown in FIG. 4D having the level determined by the above operation through the output terminal OUT.

The asymmetry correcting apparatus according to the present invention shown in FIG. 9 can also receive the RF signal removed of the direct current component, if a capacitor is connected in series with the input terminal IN1. At this time, a biasing resistor connected between the RF signal removed of the direct current component and a bias voltage of ½ Vdd, where Vdd is the power supply, supplies the bias voltage to the comparator 216.

Figure 11:
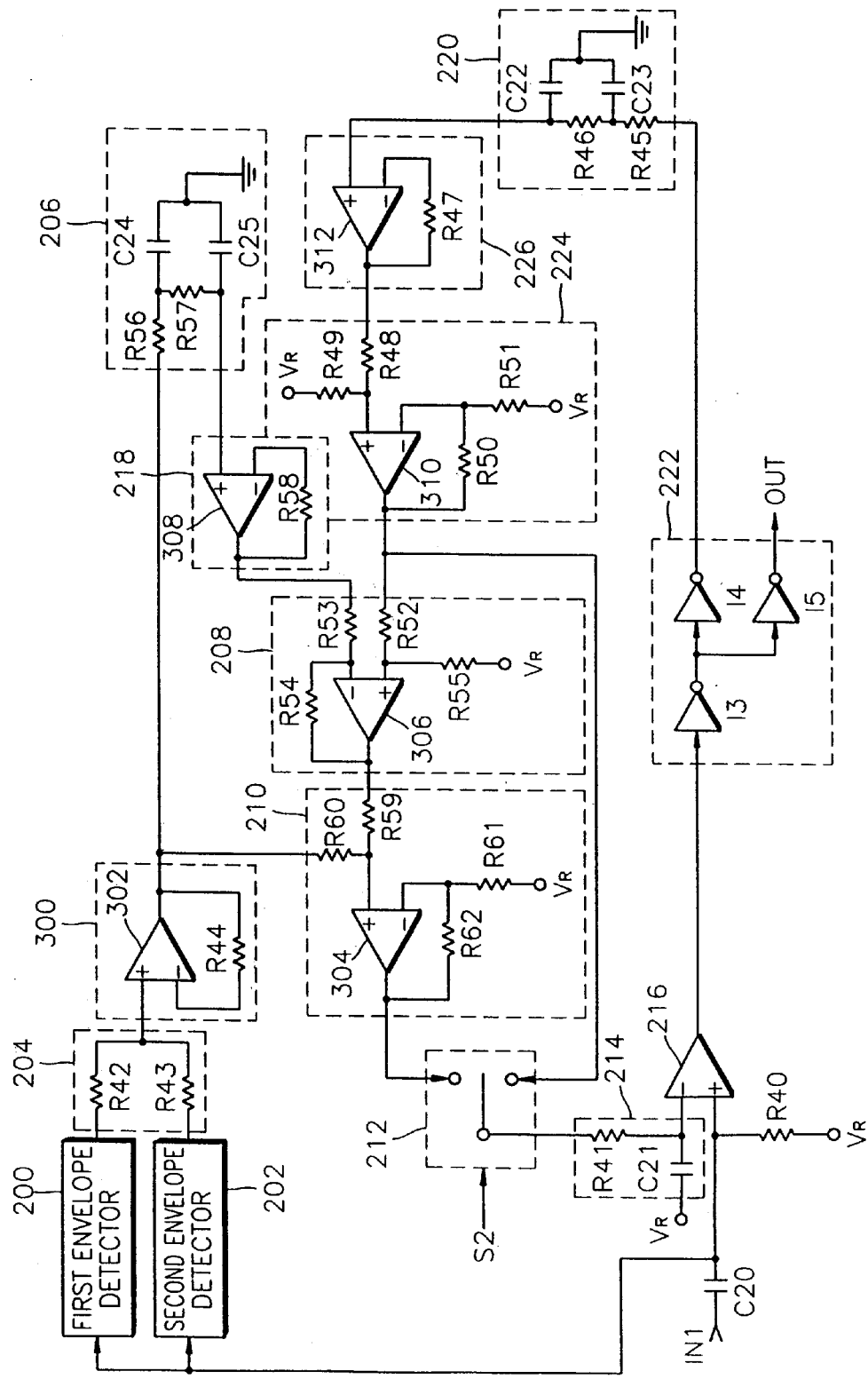
FIG. 11 is a schematic circuit diagram of the apparatus shown in FIG. 9, according to an embodiment of the present invention.

FIG. 11 is a circuit diagram of the apparatus shown in FIG. 9, according to an embodiment of the present invention. The apparatus includes first and second envelope detectors 200 and 202, a level controller 204, a buffer 300, a first low pass filter 206, a first buffer 218, a subtracter 208, an adder 210, a signal selector 212, a third lowpass filter 214, a second buffer 222, a second low pass filter 220, a third buffer 226, and an amplifier 224. The level controller 204 is comprised of resistors R42 and R43. The buffer 300 is comprised of a resistor R44 and an operational amplifier 302. The first low pass filter 206 is comprised of resistors R56 and R57 and capacitors C24 and C25. The first buffer 218 is comprised of an operational amplifier 308 and a resistor R58. The subtracter 208 is comprised of resistors R52, R53, R54, and R55 and an operational amplifier 306. The adder 210 is comprised of resistors R59, R60, R61, and R62 and an operational amplifier 304. The third low pass filter 214 is comprised of a capacitor C21 and a resistor R41. The second buffer 222 is comprised of a capacitor C20, a resistor R40, a comparator 216, and inverters I3, I4, and I5. The second low pass filter 220 is comprised of resistors R45 and R46 and capacitors C22 and C23. The third buffer 226 is comprised of a resistor R47 and an operational amplifier 312. The amplifier 224 is comprised of resistors R48, R49, R50, and R51 and an operational amplifier 310.

The asymmetry correcting apparatus according to the present invention shown in FIG. 11 can operate without the capacitor C20 and the resistor R40, as shown in FIG. 9. The capacitor 20C removes the direct current component of the RF signal input from the optical diode (not shown) through the input terminal IN1, and outputs the RF signal 84 shown in FIG. 4C removed of the direct current component to the positive input terminal of the comparator 216 and the first and second envelope detectors 200 and 202. The first and second envelope detectors 200 and 202 shown in FIG. 11 respectively correspond to the first and second envelope detectors 200 and 202 shown in FIG. 9.

Also, in the apparatus shown in FIG. 11, the level controller 204 is realized using two resistors R42 and R43, as in the apparatus shown in FIG. 2. Therefore, a buffer 300 comprised of the resistor R44 and the operational amplifier 302 tracks the level controller 204. The input port of the buffer 300 can have a Darlington configuration, unlike the one shown in FIG. 11. The second order low pass filter 206 filters the direct current component of the reference signal input through the buffer 300 using resistors R56 and R57 and capacitors C24 and C25. The first buffer 218 buffers the direct current component of the reference signal output from the second order low pass filter 206 and outputs the buffered signal to the subtracter 208.

As mentioned above, in order to reduce time spent when the digital EFM signal rises or falls, namely, to steepen the slope of a rising edge or a falling edge, the second buffer 222 buffers the digital EFM signal output from the comparator 216 and outputs the buffered digital EFM signal to the second low pass filter 220 and through the output terminal OUT. A signal is delayed more by the inverter 14 than by the inverter 15, in the second buffer 222. The second order second low pass filter 220 extracts the direct current component of the digital EFM signal output from the second buffer 222 using resistors R46 and R45 and capacitors C22 and C23.

The amplifier 224 shown in FIG. 11 amplifies the signal output from the third buffer 226 at a predetermined gain and outputs the amplified signal to the signal selector 212 and the subtracter 208. At this time, the reference voltage (VR) is half of the supply voltage (Vdd). The gain of the amplifier 224 is set by the values of resistors R48, R49, R50, and R51.

The subtracter 208 subtracts the output of the operational amplifier 308 from the output of the operational amplifier 310. The operational amplifier 306 outputs the subtraction result to the adder 210. Here, the adder 210 adds the output of the operational amplifier 302 to the output of the operational amplifier 306 and outputs the addition result to the signal selector 212. The signal selected by the signal selector 212 in response to the select signal S2 is input to the negative input terminal of the comparator 216 as the slice reference level, after noise is removed by the third low pass filter 214.

The comparator 216 compares the slice reference level input from the third low pass filter 214 to its negative input terminal with the level of the RF signal input to its positive input terminal through the capacitor C20, and outputs the digital EFM signal shown in FIG. 4D, having the level determined by the method shown in FIG. 10.

Since the apparatus shown in FIGS. 9 and 11 has a closed-loop structure, unlike the apparatus shown in FIGS. 2 and 5, the apparatus shown in FIGS. 9 and 11 can by itself correct the slice reference level when the slice reference level is not exactly corrected.

As a result, the conventional asymmetry correcting apparatus shown in FIG. 1 slices the RF signal 82 according to the reference signal 80 having a uniform slice reference level as shown in FIG. 4A, and generates the digital EFM signal shown in FIG. 4B. Therefore, the level of the digital EFM signal does not change at times, as shown in FIG. 4B, in case the level 80 of the reference signal cannot follow the RF signal 82. However, since the asymmetry correcting apparatus according to the present invention, shown in FIGS. 2, 9, or 11 follows the middle level of the RF signal 84 using the reference signal 90 having the slice reference level detected using the envelopes 86 and 88 of the RF signal 84, the apparatus can always generate the digital EFM signal having 50% duty cycle as shown in FIG. 4D. Namely, the asymmetry correcting apparatus according to the present invention can slice the RF signal with high precision, in comparison with the conventional asymmetry correcting apparatus.

The above-mentioned asymmetry correcting apparatus and method according to the present invention is applicable to an optical disk reproduction system such as a compact disk (CD) system and a digital video disk or digital versatile disk (DVD) system.

As mentioned above, since the asymmetry is corrected using the envelopes of the RF signal in the apparatus and method for correcting asymmetry of the optical disk reproduction system according to the present invention, it is possible to precisely correct the asymmetry, corresponding to the variation of the direct current component, even though a direct current component having a frequency varying from 10 KHz to 100 KHz exists in the RF signal in the system having unstable reflection-ratio due to a coarse, or otherwise defective, optical disk. In integrated circuit configurations, it is possible to reduce the number of output pins since it is not necessary to provide the external separate low pass filter 16. It is further possible to effectively remove the asymmetry even when the level of the RF signal is low and to automatically correct the asymmetry which is not exactly corrected.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An asymmetry correcting apparatus in an optical disk reproduction system, for correcting the asymmetry of an analog signal output from an optical diode and outputting the asymmetry corrected signal as a digital signal, comprising:

a first envelope detector for detecting an upper envelope of the analog signal;

a second envelope detector for detecting a lower envelope of the analog signal;

a level controller for controlling the level of the sum of the upper envelope and the lower envelope and outputting a first reference signal having a level equal to the level-controlled sum;

a first low pass filter for filtering out a high frequency component of the first reference signal and outputting the filtered result;

a second low pass filter for filtering out a high frequency component of the digital signal and outputting the filtered result;

an amplifier for amplifying a signal output from the second low pass filter by a predetermined amount and outputting the amplification result;

a subtracter for subtracting the output of the first low pass filter from the amplifier and outputting the subtraction result;

an adder for adding the output of the subtracter to the first reference signal and outputting the addition result; and a comparator for comparing the output of the adder received as a second reference signal, with the analog signal and outputting the comparison result as the digital signal.

2. The apparatus of claim 1, further comprising:

a capacitor for removing a direct current component of the analog signal and outputting the analog signal removed of the direct current component to the comparator and the first and second envelope detectors; and an eighth load, one end of which is connected to the analog signal removed of the direct current component and the other end of which is connected to a reference voltage, wherein the comparator compares the level of the analog signal removed of the direct current component with that of the second reference signal and outputs the comparison result as the digital signal, and the first and second envelope detectors respectively detect the upper envelope and the lower envelope of the Analog signal removed of the direct current component.

3. The apparatus of claim 1, further comprising a signal selector for selectively outputting either the output of the amplifier or the output of the adder as the second reference signal, to the comparator, in response to a select signal input from outside the asymmetry correcting apparatus.

4. The apparatus of claim 3, further comprising a third low pass filter for filtering out a high frequency component of the signal output from the signal selector and for outputting the filtered result to the comparator as the second reference signal.

5. The apparatus of claim 1, wherein the level controller comprises:

a ninth load, one side of which is connected to the upper envelope; and a tenth load, one side of which is connected to the lower envelope, wherein the voltage at a connection between the ninth load and the tenth load comprises the first reference signal.

6. The apparatus of claim 5, further comprising a first buffer for buffering the first reference signal and for outputting the buffered result to the first low pass filter, wherein the first low pass filter filters out a high frequency component of the signal output from the first buffer and outputs the filtered signal to the subtracter.

7. The apparatus of claim 6, wherein the first buffer comprises a Darlington configuration.

8. The apparatus of claim 1, further comprising a second buffer connected between the comparator and the second low pass filter, for buffering the output of the comparator and for outputting the buffered result to the second low pass filter as the digital signal.

9. The apparatus of claim 1, wherein the level controller comprises:

an eleventh load, one end of which is connected to the upper envelope;

a twelfth load, one end of which is connected to the lower envelope;

an operational amplifier having a positive input terminal connected to the other end of the eleventh load and a negative input terminal connected to the other end of the twelfth load;

a thirteenth load, connected between the positive input terminal and an output terminal of the operational amplifier for outputting the first reference signal; and a fourteenth load, connected between the negative input terminal and the output terminal of the operational amplifier.

10. The apparatus of claim 1, wherein the first and second envelope detectors comprise:

a first biasing means for supplying a first bias current;

a first transistor activated and deactivated in response to the analog signal;

a first capacitor charged or discharged when the first transistor is activated or deactivated, respectively;

a first current restricting means for restricting a first quantity of discharged from the first capacitor;

a first output buffer biased in response to the first bias current, for buffering a voltage held by the first capacitor and outputting the buffered voltage as the upper envelope;

second biasing means for supplying a second bias current;

a second transistor activated and deactivated in response to the analog signal;

a second capacitor discharged or charged when the second transistor is activated or deactivated, respectively;

a second current restricting means for restricting a second quantity of charge charged in the second capacitor; and a second output buffer biased in response to the second bias current, for buffering the voltage held in the second capacitor and outputting the buffered voltage as the lower envelope.

11. The apparatus of claim 10, wherein the first and second envelope detectors vary the first and second bias currents and the first and second quantities of charge according to the disk speed in the optical disk reproduction system.

12. The apparatus of claim 10, wherein the first output buffer has a Darlington configuration.

13. The apparatus of claim 10, wherein the second output buffer has a Darlington configuration.

14. An asymmetry correcting method in an optical disk reproduction system, for obtaining a digital signal by correcting the asymmetry of an analog signal output from an optical diode, comprising the steps of:

detecting an upper envelope and a lower envelope of the analog signal;

adding the upper envelope to the lower envelope;

obtaining a reference signal by controlling the level of the addition result;

extracting a direct current component of the reference signal;

subtracting the direct current component of the reference signal from a direct current component of the previously asymmetry-corrected digital signal;

obtaining a slice reference level by adding the subtraction result to the reference signal;

determining whether the level of the analog signal is larger than the slice reference level;

determining a first logic level to be the level of the currently asymmetry-corrected digital signal, when the level of the analog signal is larger than the slice reference level; and determining a second logic level supplementary to the first logic level to be the currently asymmetry-corrected level of the digital signal, when the level of the analog signal is less than the slice reference level.

15. The asymmetry correcting method of claim 14, further comprising changing the level of the digital signal when the slice reference level is the same as the level of the analog signal.

* * * * *

UNITED STATES PATENT AND TRADEMARK OFFICE
CERTIFICATE OF CORRECTION

PATENT NO. : 6,611,485 B2  Page 1 of 1
DATED : August 26, 2003
INVENTOR(S) : Je-Kook Kim et al.

It is certified that error appears in the above-identified patent and that said Letters Patent is hereby corrected as shown below:

Column 16,
Line 9, after "of" insert -- charge --.

Signed and Sealed this

Twentieth Day of January, 2004

JON W. DUDAS
*Acting Director of the United States Patent and Trademark Office*